United States Patent
Murray et al.

(10) Patent No.: US 8,070,570 B2
(45) Date of Patent: Dec. 6, 2011

(54) SPREADER DISK ASSEMBLY CONVERTIBLE FOR WINDROWING

(75) Inventors: Craig E. Murray, Rock Island, IL (US); Orlin W. Johnson, Geneseo, IL (US); John D. Watt, Davenport, IA (US); Jay D. Schroeder, Coal Valley, IL (US); Bryan B. Finley, Bettendorf, IA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/844,501

(22) Filed: Jul. 27, 2010

(65) Prior Publication Data

US 2011/0028193 A1 Feb. 3, 2011

Related U.S. Application Data

(60) Provisional application No. 61/271,939, filed on Jul. 28, 2009.

(51) Int. Cl.
*A01F 12/30* (2006.01)

(52) U.S. Cl. ........................................ 460/111; 239/681

(58) Field of Classification Search ................ 460/111, 460/112, 901; 239/681, 682, 650, 687, 673, 239/683; 416/189, 98
See application file for complete search history.

(56) References Cited

U.S. PATENT DOCUMENTS

| | | | | |
|---|---|---|---|---|
| 3,394,892 A * | 7/1968 | Speicher | ...................... | 239/683 |
| 3,539,113 A * | 11/1970 | Tyler | ............................ | 239/673 |
| 3,853,288 A * | 12/1974 | Bode | ........................... | 244/3.29 |
| 4,549,697 A * | 10/1985 | Manon | ......................... | 239/681 |
| 4,617,942 A | 10/1986 | Garner | | |
| 4,936,526 A * | 6/1990 | Gries | ............................ | 244/69 |
| 4,979,876 A * | 12/1990 | Chapman | ...................... | 416/143 |
| 5,018,669 A * | 5/1991 | van der Lely et al. | ........ | 239/665 |
| 5,570,997 A * | 11/1996 | Pratt | ............................ | 416/117 |
| 5,976,011 A * | 11/1999 | Hartman | ...................... | 460/111 |
| 6,238,286 B1 | 5/2001 | Aubry et al. | | |
| 6,508,419 B1 * | 1/2003 | Kinkead et al. | ............... | 239/668 |
| 6,699,013 B2 * | 3/2004 | Zweighaft et al. | ................ | 416/1 |
| 6,726,131 B2 | 4/2004 | Berner et al. | | |
| 6,860,713 B2 * | 3/2005 | Hoover | .......................... | 415/66 |
| 6,905,093 B2 * | 6/2005 | Dryer et al. | .................. | 244/3.28 |
| 6,972,956 B2 * | 12/2005 | Franz et al. | .................... | 361/695 |
| 7,331,855 B2 * | 2/2008 | Johnson et al. | ............... | 460/112 |
| 7,473,171 B1 | 1/2009 | Schwinn et al. | | |
| 2009/0088231 A1 | 4/2009 | Murray et al. | | |
| 2010/0248802 A1 * | 9/2010 | Lauer et al. | ................... | 460/112 |

FOREIGN PATENT DOCUMENTS

| | | |
|---|---|---|
| EP | 0585637 | 3/1994 |
| GB | 2046064 | 11/1980 |
| SU | 1021383 | 6/1983 |
| SU | 1021384 | 6/1983 |

* cited by examiner

*Primary Examiner* — Arpad Fabian-Kovacs
(74) *Attorney, Agent, or Firm* — Michael G. Harms; Sue C. Watson

(57) ABSTRACT

A spreader disk assembly for spreading crop residue such as straw discharged from an agricultural harvesting machine, and more particularly, which has a bat support mechanism that enables the bats to be quickly and easily hingedly or pivotally convertible from a deployed spreading mode to a flattened stowed mode for windrowing, which does not require removal of the bats, or the disk from the spreader. A locking mechanism is provided that enables the quick and easy conversion and securely holds the bats in both modes.

19 Claims, 6 Drawing Sheets

SPREADER DISK ASSEMBLY CONVERTIBLE FOR WINDROWING

This application claims the benefit of U.S. Provisional Application No. 61/271,939, filed Jul. 28, 2009.

TECHNICAL FIELD

This invention relates to a spreader disk assembly for spreading crop residue such as straw discharged from an agricultural harvesting machine, and more particularly, which has bats quickly and easily convertible from a deployed spreading mode to a flattened stowed mode for windrowing.

BACKGROUND ART

U.S. Provisional Application No. 61/271,939, filed Jul. 28, 2009, is incorporated herein by reference in its entirety.

Typically, as a harvesting machine, such as, but not limited to, a combine, moves through a field while harvesting a crop such as wheat or other grasses, the crop is cut and conveyed into the harvesting machine and into a threshing and separating system thereof where the grain is separated from material other than grain, commonly referred to as MOG or crop residue. Much of this crop residue, largely in the form of straw, is propelled within the machine from the threshing and separating system to a discharge outlet, typically at the rear of the machine. Also typically, within, or just outwardly of, the discharge outlet, a spreader will be provided, configured and operable for propelling the crop residue outwardly from the machine so as to be deposited in a desired pattern on the field. On some machines, rear doors are configurable in a windrowing mode such that the discharged crop residue will bypass the spreader, so as to pass outwardly from another discharge outlet in a more compact flow, for forming a windrow on a field. It is also possible for the spreader to be removed for windrowing. However, both of these options for conversion to a windrowing mode, and conversion back to the spreading node, entail a significant amount of work and time, which translates into lost harvesting productivity, and in the latter instance, the spreader must be lifted, carried and stored, which can be cumbersome, particularly, when such conversions are required multiple times during a harvesting operation, e.g., more than once daily. In this regard, it is foreseen that over the course of a harvesting operation, several different fields or regions of a field may be harvested, and that it may be desired to windrow only certain fields or regions.

One common spreader configuration is a pair of circular spreader disk assemblies mounted side-by-side generally beneath the combine's rear crop residue discharge outlet. Such spreader disk assemblies typically have been assembled from various component parts, including a spreader disk or plate and a plurality of separate spreader fins or bats of varying configurations which have been installed on the spreader plates to extend upwardly from a top surface of the spreader plate. The spreader bats have typically been secured to the spreader disks by various hardware connectors, some of which allow mounting the bats in a variety of positions or orientations. Reference variously in this regard, Berner et al. U.S. Pat. No. 6,726,131 issued Apr. 27, 2004; and Schwinn et al. U.S. Pat. No. 7,473,171 issued Jan. 6, 2009. It is also known to use an inverted disk as a manner of conversion of the spreader for windrowing, wherein the discharged crop residue will fall onto the batless side of the disks, then fall from the disks onto the ground into a windrow. Reference in this particular regard, FIG. 14 of Schwinn et al. U.S. Pat. No. 7,473,171. An advantage of this arrangement is that the crop residue is generally propelled from the discharge outlet at a relatively high speed, and striking the disk en route to the ground decelerates and reduces the speed of the residue such that it will be dropped more gently onto the stubble remaining in the field, instead of being driven into it at high velocity, so as to result in a windrow that is easier to rake and pick up. And, if a pair of side-by-side spreader disks is used and counter rotated as illustrated in the figure, they can actually control the width of the windrow to some extent. However, again, conversion to a windrowing mode, and conversion back to a spreading mode, using this apparatus involves removing and reinstalling the disks, and thus entails significant work and interruption of harvesting operations.

What is sought therefore, is a manner of quickly and easily effecting conversion of a spreader disk assembly between a spreading mode and a windrowing mode, that overcomes one or more of the shortcomings set forth above.

SUMMARY OF THE INVENTION

What is disclosed, is a spreader disk assembly quickly and easily convertible between a spreading mode and a windrowing mode, and that overcomes one or more of the shortcomings set forth above.

According to a preferred aspect of the invention, the spreader disk assembly includes a disk having a substantially planar first surface, a second surface opposite the first surface, and a rotational axis extending through a central portion of the disk between the first and second surfaces, and a plurality of elongate bats disposed on the first surface at angularly spaced locations about the rotational axis, respectively, each of the bats having a longitudinal edge pivotally or hingedly mounted to the disk for pivotal or hinged movement of the bat between a deployed position extending generally axially outwardly from the first surface, and a stowed position extending generally parallel to the first surface. The assembly additionally includes bat support mechanisms extending through the disk and connected to the bats, respectively, each of the support mechanisms being configurable in a bat deploying mode for lockingly supporting and holding the bat connected thereto in the deployed position, and in a bat stowing mode holding the bat connected thereto in the stowed position.

According to another preferred aspect of the invention, each of the bats is generally flat and will lay substantially flat against the first surface when in the stowed position. According to another preferred aspect, each of the bat support mechanisms comprises an elongate support bracket extending longitudinally through at least one slot through the disk and having a first end pivotally connected to the bat, and a second end located adjacent to the second surface, the bracket carrying a locking mechanism configurable in a first manner for supporting and holding the bat in the deployed position, and in a second manner for holding the bat in the stowed position. As another preferred aspect, the locking mechanism comprises a detent element on the second surface and a resiliently elongatable strap having one end captured and carried in a slot or slots extending longitudinally along the bracket, e.g., in a T-shaped configuration the arms of which being receivable in spaced apart, parallel slots, so as to be movable longitudinally relative thereto, and an opposite end (leg of the T-shape) configured to be cooperatively engaged and held by the detent element, wherein the strap is movable to one end of the slot and engageable with the detent element for releasably holding the bat in the deployed position, and wherein the strap is movable to an opposite end of the slot and engageable with the detent element for releasably holding the bat in the stowed position, in an over center clamping action wherein the strap is held in tension.

The spreader disk will be located below or in another suitable position in relation to a crop residue discharge outlet of a harvesting machine such as a combine, for receiving a flow of crop residue therefrom. A single disk can be used or multiple disks, e.g., commonly a pair of side-by-side disks counter rotatable by a suitable drive, such as, but not limited to, a conventional right angle bevel gear shaft drive, a belt drive, or motor drive, of well known construction. A disk can include any number of the bats, e.g., 3, 4, 6, as desired or required for a particular application.

As an advantage of the invention, the bats are simply and easily convertible between the deployed and stowed modes, by releasing the strap from the detent element, moving or repositioning the bat and the strap, and re-engaging the strap with the detent element. No removal of the bats, or the disks, is required. And, if a large number of bats is used, some of the bats, e.g., alternating ones, can be selectably moved to the stowed position, for altering the spreading characteristics.

As another advantage, in the deployed or spreading mode, the bats will operate conventionally to spread the crop residue discharged thereon in the well known manner. In the stowed mode, the bats will allow crop residue to flow thereover, while acting to decelerate and contain the flow to a width suitable for a windrow. And, the residue will be placed more gently onto the field stubble, so as to be more easily raked and picked up, and to allow better air circulation from below.

DETAILED DESCRIPTION OF THE INVENTION

Figure 1:
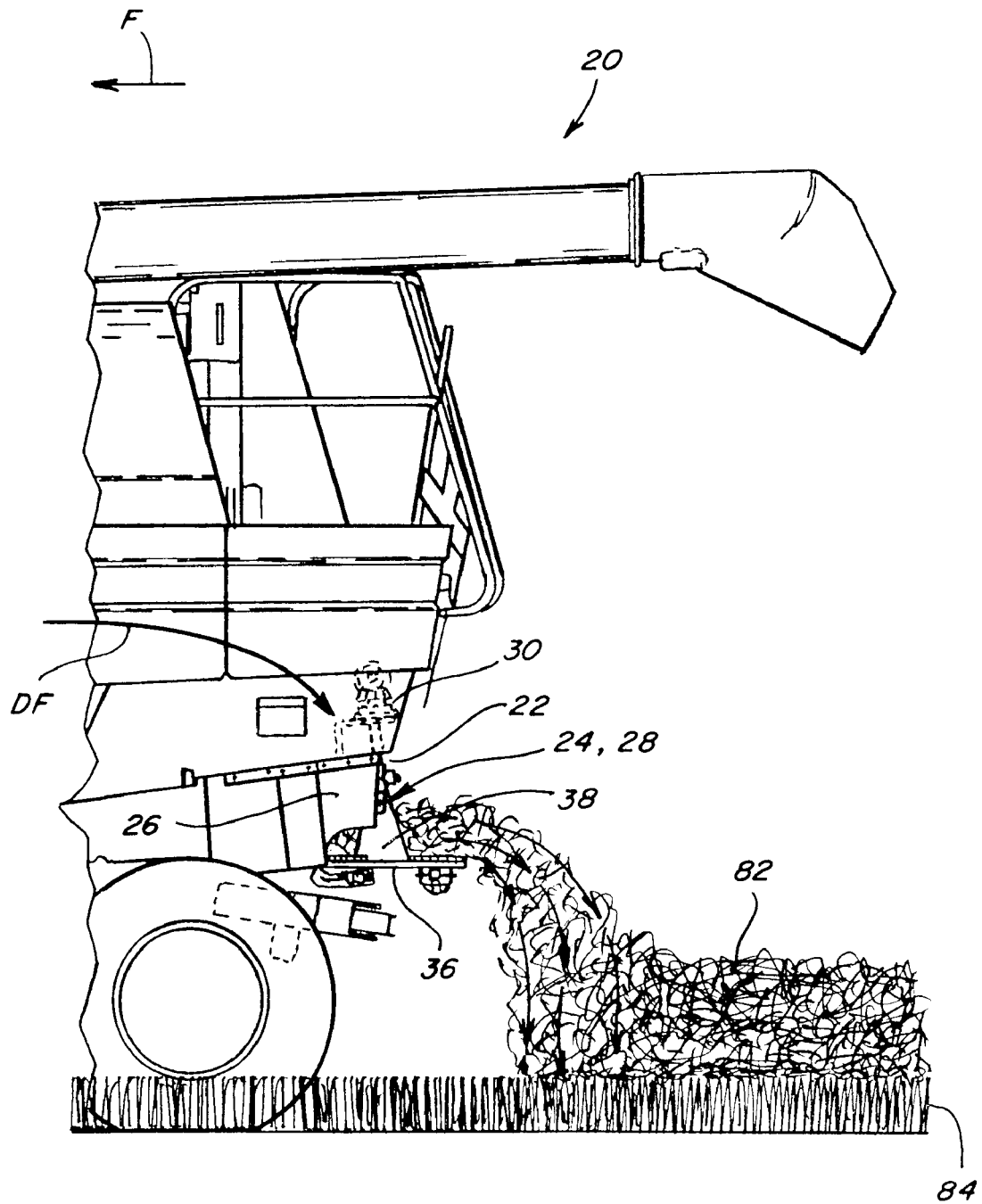
FIG. 1 is a fragmentary side view of a representative harvesting machine, including a crop residue spreader including a spreader disk assembly according to the present invention, configured in a mode for discharging the crop residue onto a field in a windrow.
Figure 2:
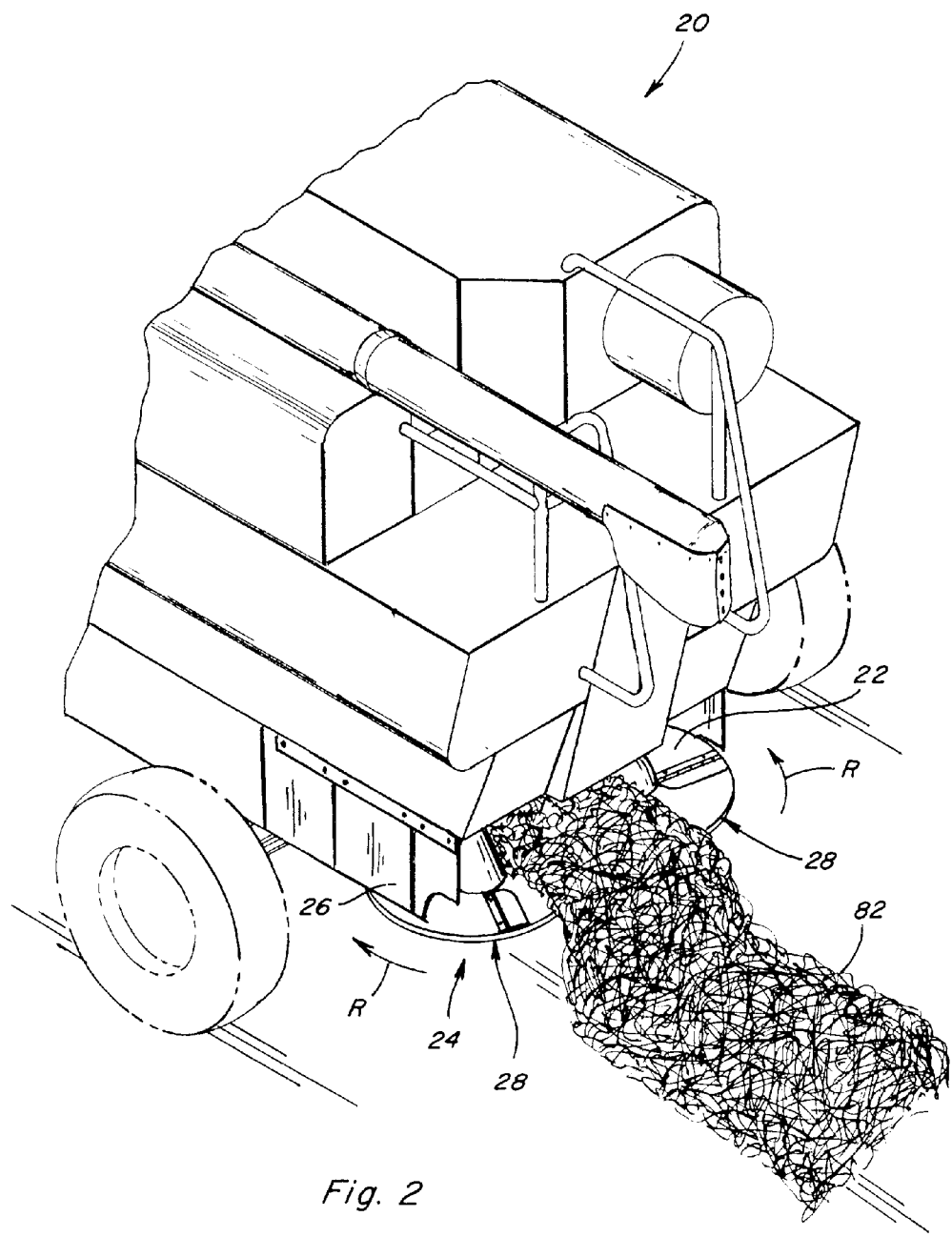
FIG. 2 is a rear perspective view of the harvesting machine of FIG. 1.
Figure 3:
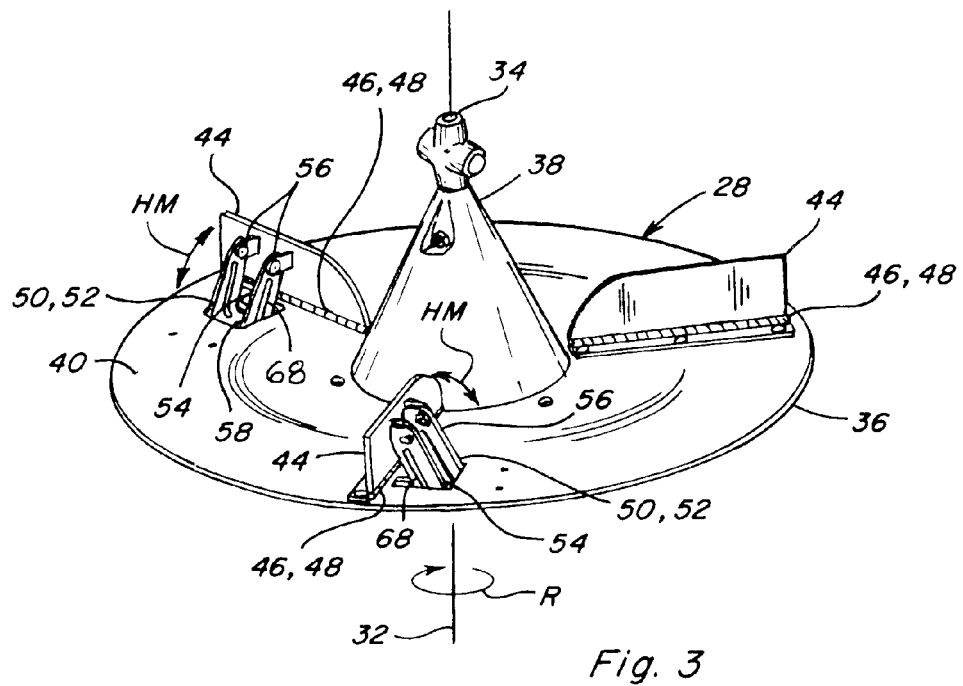
FIG. 3 is a perspective view of a spreader disk assembly of the spreader of FIG. 1, configured with a plurality of bats thereof positioned in a deployed mode for spreading.
Figure 4:
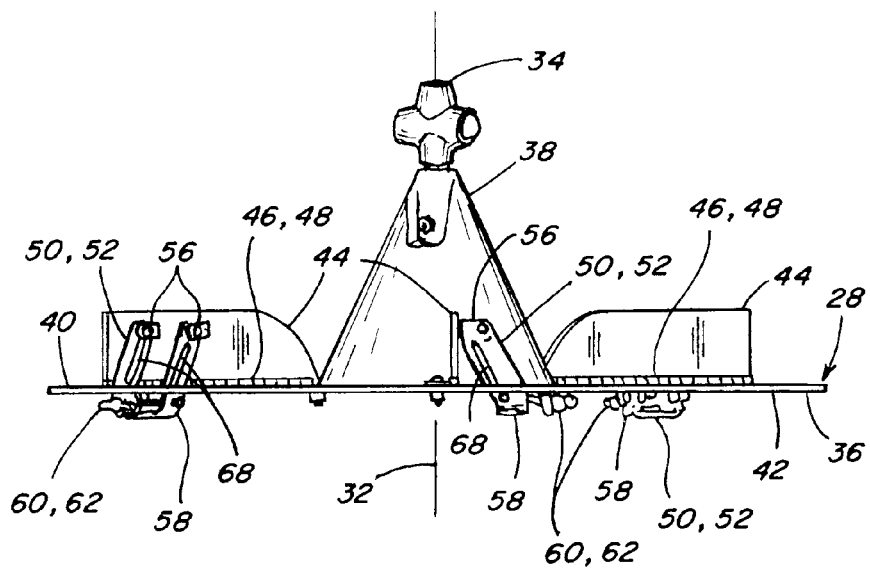
FIG. 4 is a side view of the spreader disk assembly of FIG. 3.
Figure 5:
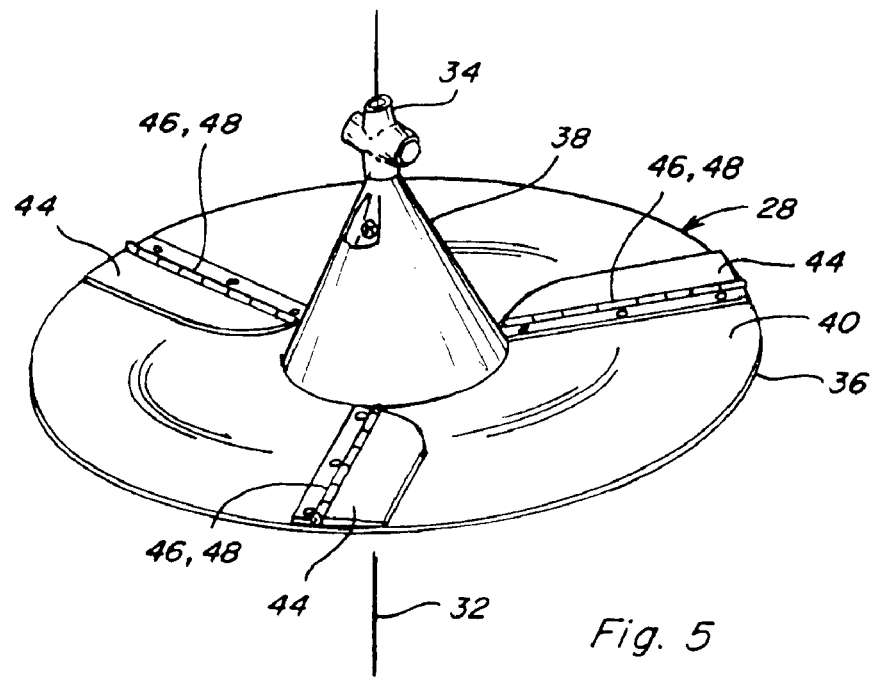
FIG. 5 is a perspective view of the spreader disk assembly of FIGS. 3-4, configured with the bats thereof in a stowed mode for windrowing.
Figure 6:
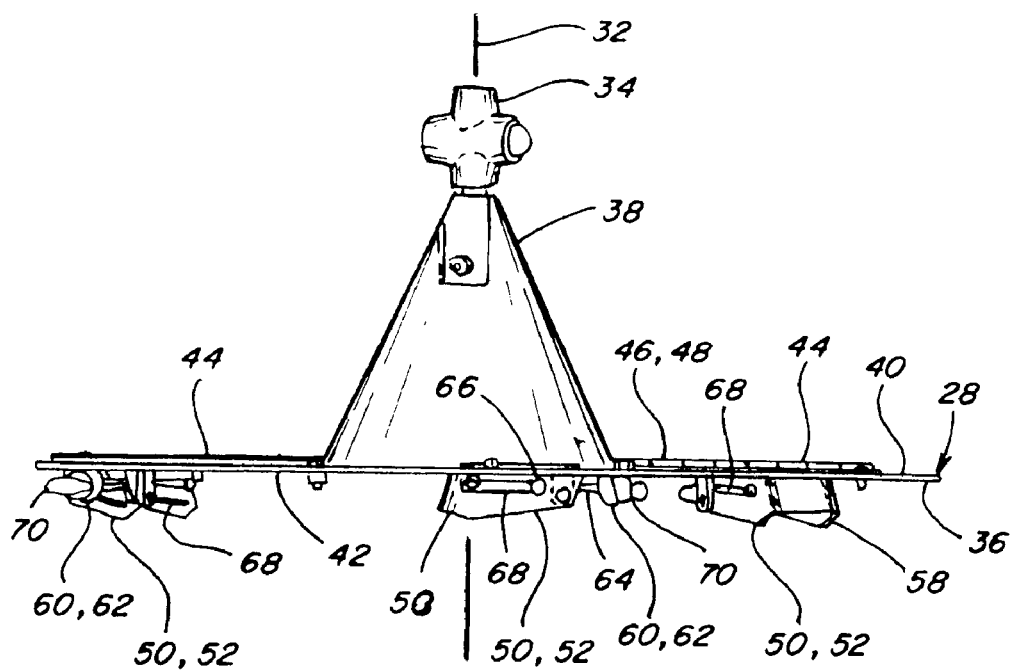
FIG. 6 is a side view of the spreader disk of FIG. 5.

Referring now to the drawings, wherein like numerals refer to like parts, in FIGS. 1 and 2, the rear end of a representative agricultural harvesting machine 20, which is a combine, is shown. Machine 20 is of conventional construction and operation, and includes harvesting apparatus operable for cutting crops as machine 20 moves forwardly over a field, as denoted by arrow F. Machine 20 also includes apparatus for conveying the cut crops into machine 20, then threshing and separating grain from the MOG, including crop residue, which when harvesting grasses such as wheat, typically includes a large quantity of straw. The crop residue is then conveyed or propelled rearwardly within machine 20, as denoted by arrow DF, and discharged through a discharge outlet 22, which, in this instance, comprises a downwardly and rearwardly facing opening at the rear of machine 20. A spreader assembly 24, is mounted generally below discharge outlet 22, and is partially concealed by side sheets 26, as shown. Spreader assembly 24 shown includes a pair of side by side spreader disk assemblies 28, which are drivingly counter rotated by a suitable drive or drives, which here is depicted as a bevel gear shaft drive 30 contained within machine 20, and constructed and operable in the well known manner. Generally, each spreader disk assembly 28 is supported by a downwardly extending shaft 34 of drive 30 for rotation, as denoted by arrow R, about a central rotational axis 32, such that the assemblies 28 counter rotated as illustrated. A more complete description of drive 30, as well as the layout and construction of spreader assemblies generally, is contained in Schwinn et al. U.S. Pat. No. 7,473,171 the disclosure of which is hereby incorporated herein by reference in its entirety.

Referring also to FIGS. 3, 4, 5, 6, 7, 8 and 9, each spreader disk assembly 28 includes a generally planar, circular disk 36, and a spreader cone 38 to which the spreader disk 36 is be joined or secured for rotation with shaft 34, both disk 36 and cone 38 be fabricated from a suitable material such as a plastics or sheet metal. Spreader disk 36 has a substantially planar first surface 40, and an opposite second surface 42, rotational axis 32 extending through a central portion of disk 36 between surfaces 40 and 42. Assembly 28 includes a plurality of elongate bats 44 disposed on first surface 40 at angularly spaced locations about rotational axis 32, respectively. Here, 3 bats 44 are shown on each disk 36 at equally angularly spaced locations, although it should be recognized and understood that a greater or lesser number of bats can be used, a desired or required for a particular application.

Each bat 44 has a longitudinal edge 46 pivotally or hingedly mounted by a hinge 48 to disk 36 for pivotal or hinged movement of bat 44, as denoted by arrows HM, between a deployed position extending generally axially outwardly from the first surface (upwardly with the disk oriented as shown in FIGS. 3, 4, 7 and 8) for spreading, and a stowed position extending generally parallel to the first surface (FIGS. 1, 2, 5, 6 and 9 (foreground)) for windrowing.

Each disk assembly 28 includes a bat support mechanism 50 in connection with each bat 44, extending through disk 36, respectively. Each bat support mechanism 50 includes an elongate support bracket 52 extending longitudinally through a slot or slots 54 through disk 36 and having a first end 56 pivotally connected to bat 44, and a second end 58 located on the opposite side of disk 36 adjacent to second surface 42.

Bracket 52 carries a locking mechanism 60, also on the opposite side of disk 36 adjacent to second surface 42, configurable in a first manner for supporting and holding bat 44 in the deployed position (FIGS. 3, 4, 7 and 8), and in a second manner for holding the bat in the stowed position (FIGS. 1, 2, 5 and 6). Locking mechanism 60 comprises a detent element 62 on or extending downwardly from second surface 42, which is a cup shaped member having a slot therethrough extending from an edge of the cup to a center region thereof, and a resiliently elongatable strap 64 having a first end 66 captured and carried in a slot or slots 68 extending longitudinally along bracket 52, and a ball shaped second end 70 cooperatively receivable in the cup of detent element 62 with strap 64 extending through the slot thereof. In a preferred configuration, bracket 52 has a U shape, and includes two parallel, spaced apart slots 68 with a channel disposed between the two legs of the U shape. The first end 66 of strap has a T shape, and the ends of the T are slidably received in slots 68 to allow movement of strap 64 therealong.

Figure 8:
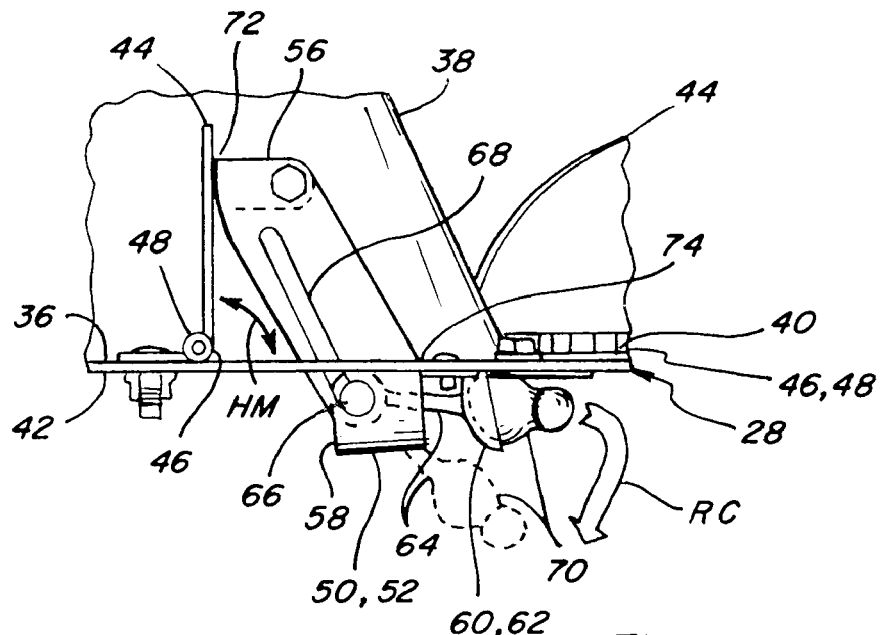
FIG. 8 is a fragmentary side view of the spreader disk assembly showing aspects of a locking mechanism thereof, illustrating locking a bat in the deployed mode.

Referring more particularly to FIG. 8, wherein locking mechanism is illustrated in a bat deploying mode, first end 56 of bracket 52 is shaped so as to have an endmost edge 72 or edges that bear against bat 44 for supporting it in its deployed mode, and which allows pivoting bracket 52 relative to the bat, and also the hinged movement of the bat itself, for hingedly moving or pivoting to the stowed position, as denoted by arrow HM. Second end 58 of bracket 52 preferably has a shape which enables an edge 74 to bear against an edge of disk 36 adjacent to slot 54 when bat 44 is in the deployed mode, bracket 52 and bat 44 being restrained in this configuration by locating strap 64 in slots 68 as shown, such that end 66 of the strap bears against bracket 52 at the end of slots 68 closest to first end 56 and the strap is resiliently elongated in tension when end 70 thereof is detained in detent element 62, such that strap 64 pulls against bracket 52 for holding it in this position, which, in turn, supports and holds bat 44 in the upstanding position of the deployed mode. An optional detent slot 76 (FIG. 9) can be provided in connection with slot 68 for receiving end 66 of the strap when in this position. This arrangement has been found to be advantageous for spreading as it is sufficiently robust for supporting and holding bats 44 in the deployed position, for resisting forces exerted thereagainst by crop residue falling thereon and pressed thereagainst during the rotation of disk assembly 28. Then, as shown by arrow RC in FIG. 8, for reconfiguring bats 44 in the stowed position, e.g., shown in FIG. 9, end 70 of strap 64 can be grasped and pulled away from detent element 62, to elongate strap 64 and remove it from the detent element as shown in dotted lines, which allows free hinged movement of bat 44 as denoted by arrow HM.

Figure 9:
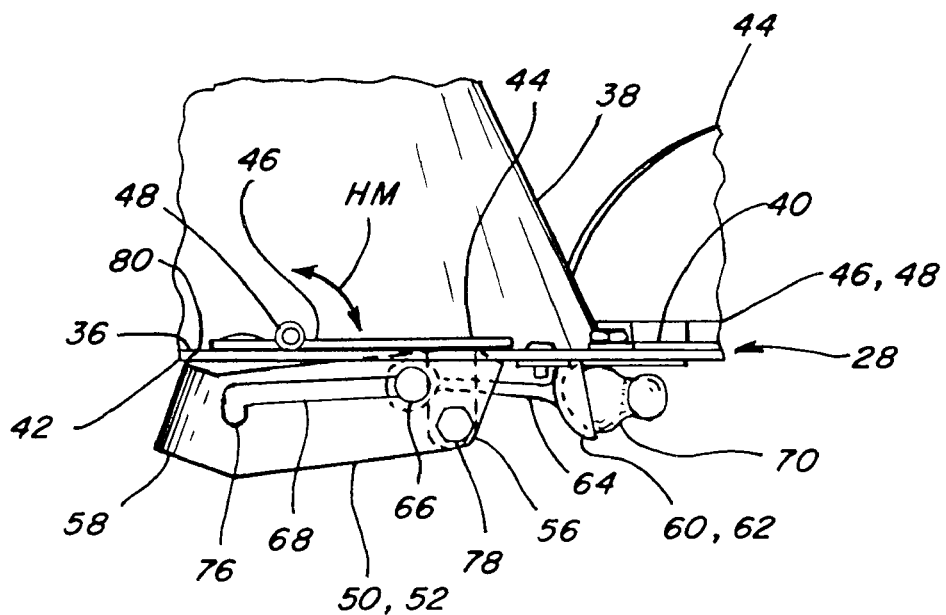
FIG. 9 is another fragmentary side view of the spreader disk assembly showing the locking mechanism locking a bat in the stowed position.

Referring more particularly to FIG. 9 also which shows mechanism 60 in a bat stowing mode, end 66 of strap 64 can be slid within slots 68 of bracket 52 to the end closest to end 56 of the bracket, as shown. As this is done, bracket 52 can be retracted through slot 54 (FIG. 3) of disk 36. By pulling strap 64 toward detent element 60, bracket 52 will be pivoted about a pivotal connection 78 to bat 44, such that end 58 of the bracket will be brought to bear against surface 42 of disk 36 at location 80. Strap 64 will then be resiliently elongated such that ball shaped end 70 can be detained in cup shaped detent element 62 in the bat stowing mode for holding bat 44 in the stowed position shown. Disk 36 is now substantially flat, which is advantageous for windrowing.

As is apparent from the above description, the present invention enables bats 44 to be simply and easily convertible between the deployed and stowed modes, by releasing strap 64 from detent element 62, moving or repositioning the bat and the strap, and re-engaging the strap with the detent element. No removal of the bats, or the disks, is required. And, if a large number of bats is used, some of the bats, e.g., alternating ones, can be selectably moved to the stowed position, for altering the spreading characteristics.

Figure 7:
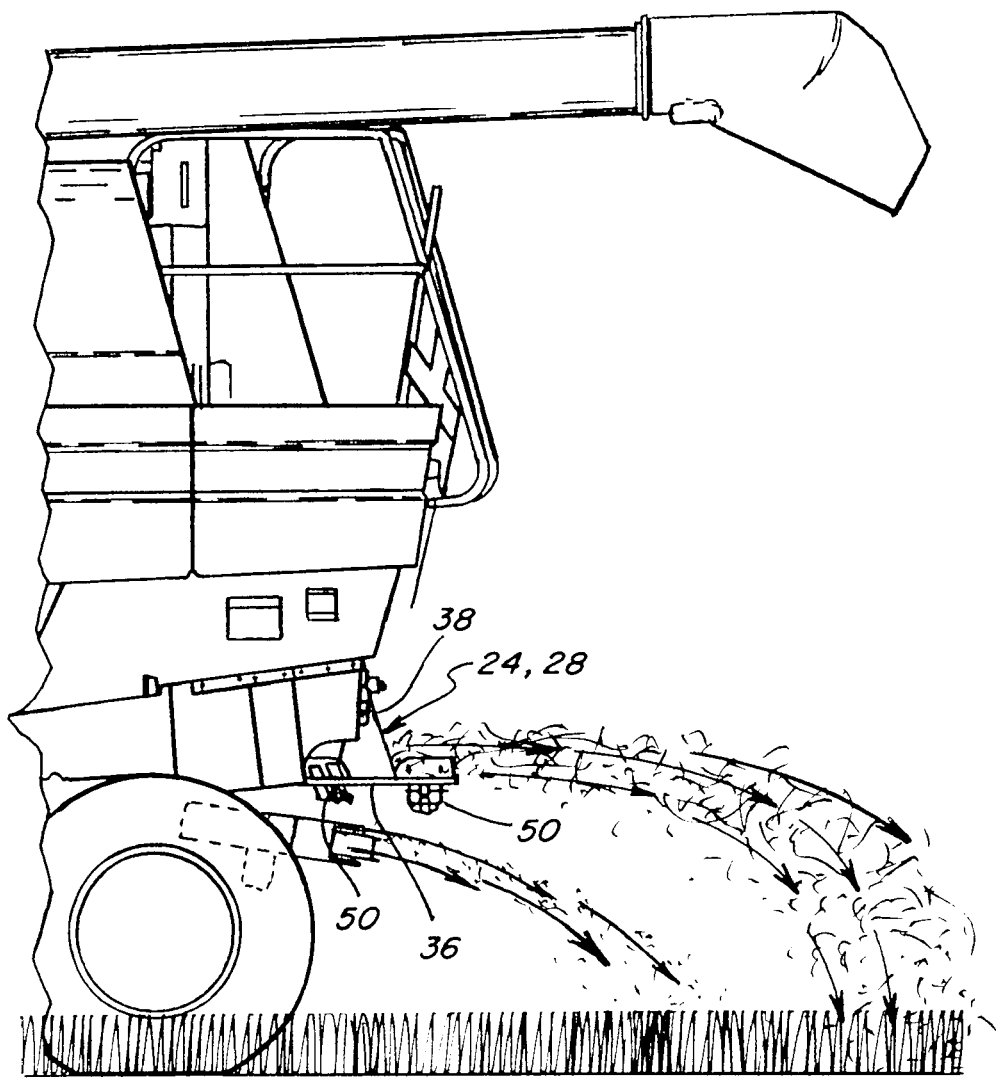
FIG. 7 is another fragmentary side view of the harvesting machine of FIG. 1, with the crop residue spreader configured in a mode for spreading the crop residue onto a field.

As another advantage, in the deployed or spreading mode, the bats will operate conventionally to spread the crop residue discharged thereon in the well known manner, as illustrated in FIG. 7. In the stowed mode, the bats will allow crop residue to flow thereover, while acting to decelerate and reduce the velocity of the crop residue flow, and contain the flow to a width suitable for a windrow, as illustrated by windrow 82 in FIGS. 1 and 2. Here, it can be observed in FIG. 2, that this enables the crop residue to be placed on standing stubble 84 sufficiently gently so as to rest in the top of the stubble and not integrate therein, to enable better air circulation for drying, and easier raking and picking up for baling and the like.

In light of the foregoing, it should thus be apparent to those skilled in the art that there has been shown and described herein a spreader disk assembly convertible for windrowing which provides one or more of the advantages sought therefor, and overcomes one or more of the shortcomings, set forth above. However, it should also be apparent that, within the principles and scope of the invention, many changes are possible and contemplated, including in the details, materials, and arrangements of parts and elements which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A spreader disk assembly for an agricultural harvesting machine, comprising:

a disk having a substantially planar first surface, a second surface opposite the first surface, and a rotational axis extending through a central portion of the disk between the first and second surfaces;

a plurality of elongate bats disposed on the first surface at angularly spaced locations about the rotational axis, respectively, each of the bats having a longitudinal edge pivotally mounted to the disk for pivotal movement of the bat between a deployed position extending generally axially outwardly from the first surface, and a stowed position extending generally parallel to the first surface; and bat support mechanisms extending through slots formed through the disk and connected to the bats, respectively, each of the support mechanisms being configurable in a bat deploying mode for movably extending through a slot for lockingly supporting and holding the bat connected thereto in the deployed position, and each of the support mechanisms being configurable in a bat stowing mode for unlocking the bat connect thereto from the deployed position and moving the bat to a bat stowing position while movably retracting from the slot and holding the bat connected thereto in the stowed position, wherein the bat support mechanism is positioned below the first surface and adjacent the second surface when the bat is held in the stowed position, and wherein each of the bats is generally flat and will lay substantially flat against the first surface when in the stowed position.

2. The spreader disk assembly of claim 1, wherein the disk is comprises a substantially planar first surface adjacent its outer radial edge, and a substantially frusto-conical surface in its central portion.

3. The spreader disk assembly of claim 1, wherein each of the bat support mechanisms comprises an elongate support bracket extending longitudinally through at least one slot through the disk and having a first end connected to the bat, and a second end located adjacent to the second surface, the bracket carrying a locked mechanism configurable in a first manner for supporting and holding the bat in the deployed position, and in a second manner for holding the bat in the stowed position.

4. The spreader disk assembly of claim 3, wherein the locking mechanism comprises a detent element on the second surface and a resiliently elongatable strap having one end captured and carried in a slot extending longitudinally along the bracket so as to be movable longitudinally relative thereto, and an opposite end configured to be cooperatively engaged and held by the detent element, wherein the strap is movable to one end of the slot and engageable with the detent element for releasably holding the bat in the deployed position, and wherein the strap is movable to an opposite end of the slot and engageable with the detent element for releasably holding the bat in the stowed position.

5. The spreader disk assembly of claim 1, wherein the disk is supported below a crop residue discharge outlet of a harvesting machine and is connected in rotatably driven relation to a drive operable for rotating the disk about the rotational axis in a manner such that crop residue discharged onto the disk when rotating will be propelled radially outwardly by the bats when in the deployed position, and will pass over the bats when in the stowed position.

6. A spreader disk assembly for an agricultural harvesting machine, comprising:
   a disk having a substantially planar first surface, a second surface opposite the first surface, and a rotational axis extending through a central portion of the disk between the first and second surfaces;
   a plurality of elongate bats disposed on the first surface at angularly spaced locations about the rotational axis, respectively, each of the bats having a longitudinal edge hingedly mounted to the disk for hinged movement of the bat between a deployed position extending generally axially outwardly from the first surface, and a stowed position extending generally parallel to the first surface;
   bat support mechanisms extending through slots formed through the first and second surfaces of the disk and connected to the bats, respectively, each of the support mechanisms being configurable in a bat deploying mode for movably extending through a slot for lockingly supporting and holding the bat connected thereto in the deployed position, and each of the support mechanisms being configurable in a bat stowing mode for unlocking the bat connect thereto from the deployed position and moving the bat to a bat stowing position while movably retracting from the slot and holding the bat connected thereto in the stowed position,
   wherein the bat support mechanism is positioned below the first surface and adjacent the second surface when the bat is held in the stowed position, and
   wherein each of the bats is generally flat and will lay substantially flat against the first surface when in the stowed position, and
   the disk being supported below a crop residue discharge outlet of a harvesting machine such that crop residue discharged therefrom will impinge the first surface, and such that, when the disk is rotated, if the bats are in the deployed position the crop residue will be spread by the spreader disk assembly in a swath having a sideward extend greater than a sideward extent of the disk, and if the bats are in the stowed position the crop residue that impinges the disk will fall from the disk in a windrow having a sideward extent about equal to the sideward extent of the disk.

7. The spreader disk assembly of claim 6, wherein the disk comprises a substantially planar first surface adjacent its outer radial edge, and a substantially frusto-conical surface in its central portion.

8. The spreader disk assembly of claim 7, wherein each of the bat support mechanisms comprises an elongate support bracket extending longitudinally through at least one slot through the disk and having a first end pivotally mounted to the bat, and a second end located adjacent to the second surface, the bracket carrying a locking mechanism configurable in a first manner for supporting and holding the bat in the deployed position, and in a second manner for resiliently biasing the bat against the first surface.

9. The spreader disk assembly of claim 8, wherein the locking mechanism comprises a detent element on the second surface and a resiliently elongated strap having one end captured and carried in a slot extending longitudinally along the bracket so as to be movable longitudinally relative thereto, and an opposite end configured to be cooperatively engaged and held by the detent element, wherein the strap is movable to one end of the slot and engageable with the detent element for releasably holding the bat in the deployed position, and wherein the strap is movable to an opposite end of the slot and engageable with the detent element for releasably and resiliently holding the bat in the stowed position.

10. The spreader disk assembly of claim 6, comprising two of the disks disposed in side-by-side relation below the crop residue discharge outlet.

11. A spreader disk assembly, comprising:
   a pair of disks supported in side-by-side relation beneath a crop residue discharge outlet of a harvesting machine for receiving a flow of crop residue discharged therefrom, each of the disks having a substantially planar first surface disposed to be impinged by the crop residue flow, a second surface opposite and beneath the first surface, and a rotational axis extending through a central portion of the disk between the first and second surfaces;
   a plurality of elongate bats disposed on the first surface of each of the disks at angularly spaced locations about the rotational axis, respectively, each of the bats having a longitudinal edge hingedly mounted to the disk for hinged movement of the bat between a deployed position extending generally axially outwardly from the first surface, and a stowed position extending generally parallel to the first surface;
   bat support mechanisms extending through slots formed through the first and second surfaces of the disks and connected to the bats of each of the disks, respectively, each of the support mechanisms being configurable in a bat deploying mode for movably extending through a slot in each disk for lockingly supporting and holding the bat connected thereto in the deployed position, and each of the support mechanisms being configurable in a bat stowing mode for unlocking the bat connect thereto from the deployed position and moving the bat to a bat stowing position while movably retracting from the slot and holding the bat connected thereto in the stowed position,
   wherein the bat support mechanism is positioned below the first surface and adjacent the second surface when the bat is held in the stowed position, and
   wherein each of the bats is generally flat and will lay substantially flat against the first surface when in the stowed position, and
   a drive connected to the disks and operable for counter rotating the disks about the rotational axis, respectively, such that when the bats are in the deployed position and the disks are rotated any crop residue that impinges the first surfaces of the disks will be spread in a dispersed pattern by the bats, and such that when the bats are in the stowed position and the disks are rotated any crop residue that impinges the first surfaces of the disks will be decelerated and dropped substantially directly downwardly from the disks.

12. The spreader disk assembly of claim 11, wherein each disk comprises a substantially planar first surface adjacent its outer radial edge, and a substantially frusto-conical surface in its central portion.

13. The spreader disk assembly of claim 11, wherein each of the bat support mechanisms comprises an elongate support bracket extending longitudinally through at least one slot through the disk and having a first end mounted to the bat, and a second end located adjacent to the second surface, the bracket carrying a locking mechanism configurable in a first manner for supporting and holding the bat in the deployed position, and in a second manner for holding the bat in the stowed position.

14. The spreader disk assembly of claim 13, wherein the locking mechanism comprises a detent element on the second surface and a resiliently elongatable strap having one end captured and carried in a slot extending longitudinally along the bracket so as to be movable longitudinally relative thereto, and an opposite end configured to be cooperatively engaged and held by the detent element, wherein the strap is movable to one end of the slot and engageable with the detent element for releaseably holding the bat in the deployed position, and wherein the strap is movable to an opposite end of the slot and engageable with the detent element for releasably holding the bat in the stowed position.

15. The spreader disk assembly of claim 12, wherein each disk counter rotates and the frusto-conical surface of each of the disks cooperate to direct a flow of crop residue from the harvesting machine.

16. A spreader disk assembly for an agricultural harvesting machine, comprising:
   a disk having a substantially planar first surface adjacent its outer radial edge, and a substantially frusto-conical surface in its central portion, and a second surface opposite the first surface, and a rotational axis extending through the frusto-conical surface of the central portion of the disk;
   a plurality of elongate bats disposed on the first surface at angularly spaced locations about the rotational axis, respectively, each of the bats having a longitudinal edge pivotally mounted to the disk for pivotal movement of the bat between a deployed position extending generally axially outwardly from the first surface, and a stowed position extending generally parallel to the first surface; and
   bat support mechanisms extending through slots formed through the disk and connected to the bats, respectively, each of the support mechanisms being configurable in a bat deploying mode for movably extending through a slot for lockingly supporting and holding the bat connected thereto in the deployed position, and each of the support mechanisms being configurable in a bat stowing mode for unlocking the bat connect thereto from the deployed position and moving the bat to a bat stowing position while movably retracting from the slot and holding the bat connected thereto in the stowed position, wherein the bat support mechanism is positioned below the first surface and adjacent the second surface when the bat is held in the stowed position.

17. The spreader disk assembly of claim 16, wherein each of the bat support mechanisms comprises an elongate support bracket extending longitudinally through at least one slot through the disk and having a first end connected to the bat, and a second end located adjacent to the second surface, the bracket carrying a locked mechanism configurable in a first manner for supporting and holding the bat in the deployed position, and in a second manner for holding the bat in the stowed position.

18. The spreader disk assembly of claim 17, wherein the locking mechanism comprises a detent element on the second surface and a resiliently elongatable strap having one end captured and carried in a slot extending longitudinally along the bracket so as to be movable longitudinally relative thereto, and an opposite end configured to be cooperatively engaged and held by the detent element, wherein the strap is movable to one end of the slot and engageable with the detent element for releasably holding the bat in the deployed position, and wherein the strap is movable to an opposite end of the slot and engageable with the detent element for releasably holding the bat in the stowed position.

19. The spreader disk assembly of claim 18, wherein the disk is supported below a crop residue discharge outlet of a harvesting machine and is connected in rotatably driven relation to a drive operable for rotating the disk about the rotational axis in a manner such that crop residue discharged onto the disk when rotating will be propelled radially outwardly by the bats when in the deployed position, and will pass over the bats when in the stowed position.

\* \* \* \* \*